United States Patent
Mishra et al.

(10) Patent No.: US 9,811,856 B2
(45) Date of Patent: Nov. 7, 2017

(54) SYSTEM AND METHOD FOR REDUCING A PROCESSING TIME FOR A BANK TRANSACTION

(71) Applicant: NCR Corporation, Duluth, GA (US)

(72) Inventors: Ravi Prakash Mishra, Jhansi (IN); Sateesh Rudraraju, Hyderabad (IN); Raghu Vaddiraju, Hyderabad (IN); Suresh Kumar Rampalli, Hyderabad (IN); K. V. S. Narendra Babu, Hyderabad (IN); Shiva Kumar Vadthyavath, Hyderabad (IN)

(73) Assignee: NCR Corporation, Duluth, GA (US)

( * ) Notice: Subject to any disclaimer, the term of this patent is extended or adjusted under 35 U.S.C. 154(b) by 2 days.

(21) Appl. No.: 14/170,066

(22) Filed: Jan. 31, 2014

(65) Prior Publication Data

US 2015/0136847 A1    May 21, 2015

(30) Foreign Application Priority Data

Nov. 18, 2013 (IN) .......................... 5307/CHE/2013

(51) Int. Cl.
*G06Q 40/02* (2012.01)
(52) U.S. Cl.
CPC .................. *G06Q 40/02* (2013.01)

(58) Field of Classification Search
CPC ........ G06Q 40/02; G06Q 20/10; G06Q 40/00; G06Q 20/204; G06Q 30/0631; G06Q 50/01; G06Q 30/06; G06Q 30/02; G06N 5/048
USPC ......................................... 235/379, 375, 494
See application file for complete search history.

(56) References Cited

U.S. PATENT DOCUMENTS

| | | | | |
|---|---|---|---|---|
| 5,962,829 A | * | 10/1999 | Yoshinaga | ..................... 235/375 |
| 8,146,805 B1 | * | 4/2012 | Davis | ................... G06Q 20/108 235/375 |
| 8,556,164 B1 | * | 10/2013 | Freedman | .......... G06Q 30/0207 235/375 |
| 2003/0066876 A1 | * | 4/2003 | Goldman | ........... G06Q 20/4014 235/379 |
| 2012/0055987 A1 | * | 3/2012 | Drummond et al. | ......... 235/379 |
| 2013/0173344 A1 | * | 7/2013 | Kundagrami | .......... G06Q 40/02 705/7.32 |
| 2014/0263617 A1 | * | 9/2014 | Johnson | ............... G06Q 20/108 235/379 |

* cited by examiner

*Primary Examiner* — Sonji Johnson
(74) *Attorney, Agent, or Firm* — Schwegman, Lundberg & Woessner (57) ABSTRACT

A system for reducing a processing time for a bank transaction is provided. The system includes a kiosk (102) which has (i) an input means (202) for receiving an information related to the bank transaction, (ii) a controller (204) which is configured to receive the information and generate a coded information; and (iii) a dispensing means (206) which dispenses a pre-processed receipt (104) which comprises the coded information (110).

15 Claims, 12 Drawing Sheets

SYSTEM AND METHOD FOR REDUCING A PROCESSING TIME FOR A BANK TRANSACTION

FIELD OF THE INVENTION

The present invention generally relates to a system and method for reducing a processing time for a bank transaction in a bank, and more particularly, but not exclusively, to the system for generating and processing a pre-processed receipt for the bank transaction, the pre-processed receipt includes a coded information which is related to the bank transaction and thus reduces the processing time for the bank transaction in the bank.

BACKGROUND OF THE INVENTION

Banks play the critical role by providing banking services essential to the functioning of an economy. The banking service includes safeguarding, transferring, lending, and exchanging money in various forms, along with evaluating creditworthiness of user/customers. Banks face a number of challenges in providing banking services to their customers. One of those challenges is providing fast, personal, and economically efficient service to their customers. Traditionally, the customer needs to approach the teller windows for availing the banking service. However in the traditional process, the customer needs to spend more time in the bank to perform the transaction because of the peaks and valleys of customer demand throughout a day in the banks. Hence the customer needs to wait in long queue to avail the banking service. Often, the customer may not know or be given an estimate about how long the customer may need to wait before being served. Furthermore, the customer may need to remain in the vicinity of the teller to secure a place in the queue. Waiting in queues may be an unpleasant experience for the customer.

The traditional banking system also takes much time to serve a single customer. Hence, the teller who is sitting in the teller window needs to enter the details of the transaction into the banking system by reading the details entered in the challan by the customer. This increases the processing time of the transaction. Further, the teller may make mistake while entering the details into the banking system.

To overcome this issue, the banks should incorporate more man power but that increases the staffing costs of the banks. In an attempt to reduce staffing costs, banks turned to installing automated teller machines (ATM), both at the bank itself as well as in a variety of retail locations. The latest ATM's are capable of addressing a wide variety of banking server such as cash deposit, cheque deposit and the cash withdraw. However, ATM's do not address the desire of many customers to have a personal/human relationship with their banks. Further, the user needs to enter all the details related to the bank transaction every time even he/she needs to perform the same transaction often.

Accordingly there is a need in the art to provide a solution to one or more of above said problems. The present invention solves one or more of these problems in a unique and economical manner.

SUMMARY OF THE INVENTION

It is a feature of the present invention to provide a system which substantially overcomes the one or more of the above mentioned disadvantages.

It is the principal object of the present embodiment to provide a system and method for reducing the processing time for bank transaction through a pre-processed receipt. The present embodiment provides a system for generating pre-processed receipt for bank transaction and the pre-processed receipt includes a coded information related to the bank transaction and thus reduces the processing time of bank transaction in the bank Another object of the present embodiment is to provide the system and method for processing the pre-processed receipt for completing the bank transaction through a kiosk and also through a teller system.

In one aspect, a system for reducing a processing time for a bank transaction is provided. The system includes a kiosk which has an input means for receiving information related to the bank transaction, a controller which is configured to receive the information and generate coded information, and a dispensing means which dispenses a pre-processed receipt which comprises the coded information. The system also includes a reader for reading the pre-processed receipt and obtains the information related to the bank transaction from the coded information and a communication means for communicating the information to a central bank server for completing the bank transaction. The bank transaction is a cash deposit, a cheque deposit or a demand draft request. The coded information is generated based on at least one of QR code and barcode. The information comprises an account number, an account name and an amount corresponds to the bank transaction. The input means is a touch screen or a keyboard. The kiosk may also includes (i) a reader for reading the pre-processed receipt and obtains the information related to the bank transaction from the coded information, (ii) receiving means which is configured to receive and validates a currency for the bank transaction and (iii) a communication means for communicating the information to a central bank server and completes the bank transaction.

In another aspect, the method for reducing a processing time for a bank transaction is provided. The method includes (a) receiving, at an input means, an information related to the bank transaction, (b) generating, at a controller, a coded information based on the information received in the input means, (d) dispensing, at a dispensing means, the processed receipt which comprises the coded information, (e) reading, at a reader, the coded information in the pre-processed receipt to obtain the information related to the bank transaction, wherein the coded information includes an account number, an account name and an amount, (f) receiving the amount and validating the amount with the information extracted from the pre-processed receipt, (h) communicating the information to the central bank server for completing the bank transaction and (i) providing the acknowledgement slip after completing the bank transaction successfully. In another embodiment, the method also includes (a) reading, at a reader of the kiosk, the coded information in the pre-processed receipt to obtain the information related to the bank transaction (b) receiving, at a receiving means at the kiosk, a currency, (c) verifying, at the controller, the currency with the amount, (d) communicating, through a communication means, the information to a central bank server after verifying the currency, (e) processing, at the central bank server, the information and completes the bank transaction, and (f) dispensing, at the dispensing means, an acknowledgement slip after completing the bank transaction successfully.

BRIEF DESCRIPTION OF THE ACCOMPANYING DRAWINGS

The advantages and features of the invention will become more clearly apparent from the following description which refers to the accompanying drawings given as non-restrictive examples only and in which.

DETAILED DESCRIPTION OF THE INVENTION

The present invention will be described herein below with reference to the accompanying drawings. A system and method for reducing a processing time for bank transaction in a bank is described.

The following description is of exemplary embodiment of the invention only, and is not limit the scope, applicability or configuration of the invention. Rather, the following description is intended to provide a convenient illustration for implementing various embodiments of the invention. As will become apparent, various changes may be made in the function and arrangement of the structural/operational features described in these embodiments without departing from the scope of the invention as set forth herein. It should be appreciated that the description herein may be adapted to be employed with alternatively configured devices having different shaped, components, and the like and still fall within the scope of the present invention. Thus the detailed description herein is presented for purposes of illustration only and not of limitation.

The present embodiments provides a system and method for reducing a processing time for a bank transaction in a bank, and more particularly, but not exclusively, the embodiment relates to the system for generating and processing a pre-processed receipt for the bank transaction and the pre-processed receipt includes a coded information related to the bank transaction.

Figure 1A:
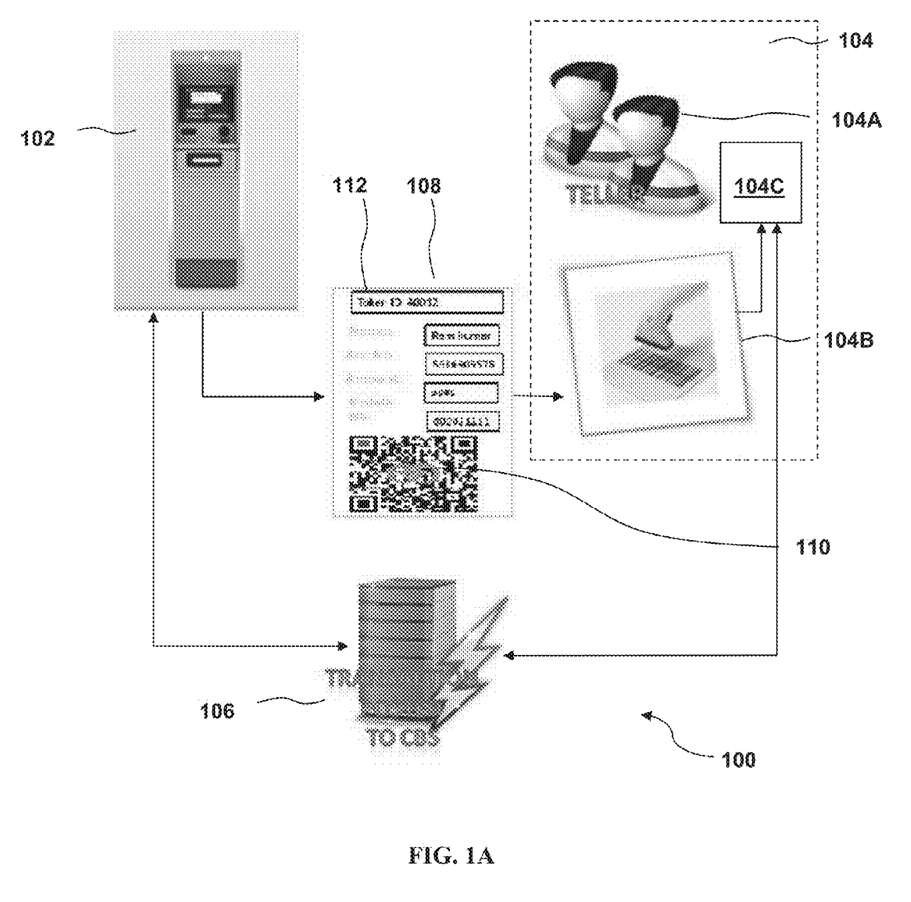
FIG. 1A illustrates a system for reducing a processing time for a bank transaction in accordance to a preferred embodiment herein.

FIG. 1A illustrates a system 100 for reducing the processing time for the bank transaction in accordance to a preferred embodiment herein. The system includes a kiosk 102, a teller system 104 and a central bank server 106. The kiosk 102 is configured to generate the pre-processed receipt 108 as well as process the pre-processed receipt 108 for performing the bank transaction. The kiosk 102 includes an input means, a controller and a dispensing means. The input means is used to receive a type of bank transaction and information related to the type of bank transaction. In one example, the input means is keyboard but not limited to any device which is capable of inputting the information to the kiosk 102. In another example, the input means can be a touch screen display which displays the interface for receiving the information. In yet another example, the input means can accept the card which stores the part of information i.e. the account number and the account name.

The type of bank transaction includes but not limited to a cash deposit, a cheque deposit and a demand draft request. For example, if a user inputs the type of transaction is cash deposit then the information corresponds to the type of transaction includes (i) account number, (ii) an account name, (iii) an amount of cash going to deposit and (iv) a denomination. The kiosk 102 receives the input through input means and generates the coded information by embedding the information related to the bank transaction. The coded information along with a token ID 112 is printed in the pre-processed receipt 108 and dispensed through the dispensing means (not shown in FIG. 1A). The token ID 112 includes a sequence number which is generated by the kiosk 102 and an identity of the kiosk 102. The kiosk 102 is in communication with the central bank server 106 and transfers the token ID 112 along with the information related to the bank transaction. The central bank server 106 includes a token database (not shown) which stores the token ID 112 and the information related to the bank transaction.

Figure 1B:
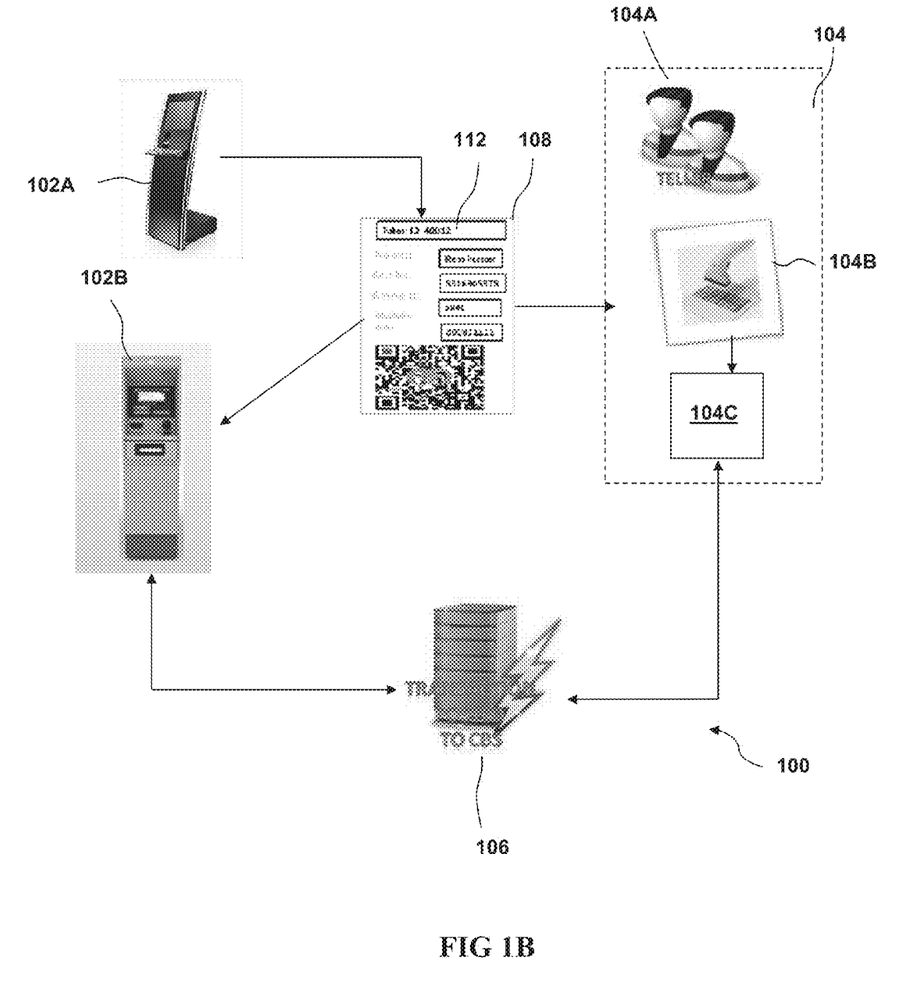
FIG. 1B illustrates the system for reducing a processing time for a bank transaction in accordance to another embodiment herein.

FIG. 1B illustrates a system 100 for reducing the processing time for the bank transaction in accordance to another embodiment herein. The system includes a first kiosk 102A and a second kiosk 102B. The first kiosk 102A is configured to generate and dispense the pre-processed receipt 108 alone. The second kiosk 102B is configured to read the information coded in the pre-processed receipt 108 and perform the bank transaction by communicating the information to the central server 106.

In one scenario, the user may reach a teller system 104 and show the pre-processed receipt 108 to a teller 104A. The teller system 104 includes a reader 104B and a controller 104C. The reader 104B reads the coded information in the pre-processed receipt 108 and extracts the information related to the bank transaction. The teller 104A verifies the information with the user and collects the cash/cheque from the user. Once, the teller 104A validates the cash/cheque corresponds to the bank transaction then the teller 104A communicates the information related to the bank transaction to the central bank server 106 through a communicating means (not shown in figure) of the controller 104C and completes the bank transaction. The pre-processed receipt 108 is used to reduce the time for entering the information related to the bank transaction when the user approaches teller 104A, since the teller 104A obtains the information by just reading the pre-processed receipt 108 through the reader 104B and thus saves time of the teller 104A and facilitates the teller 104A to serve many users/customers. In yet another embodiment, the teller system 104 may not equipped with the reader 104B and in this scenario the teller 104A inputs the token ID 112 present in the pre-processed receipt 108 to the central server 106 through the communication means of the controller 104C. The central server 106 searches the token ID 112 in the token database and returns the information related bank transaction which is stored in corresponds to the token ID 118. The teller 104A process the bank transaction after verifying the information with the customer/user. The communicating means includes the wired or wireless connectivity for communicating the information to the central bank server 106.

In another scenario, the user may approach the kiosk 102 again to complete the bank transaction in accordance to FIG. 1A. In yet another scenario, the user may approach the second kiosk 102B to complete bank transaction in accordance to FIG. 1B.

Figure 2:
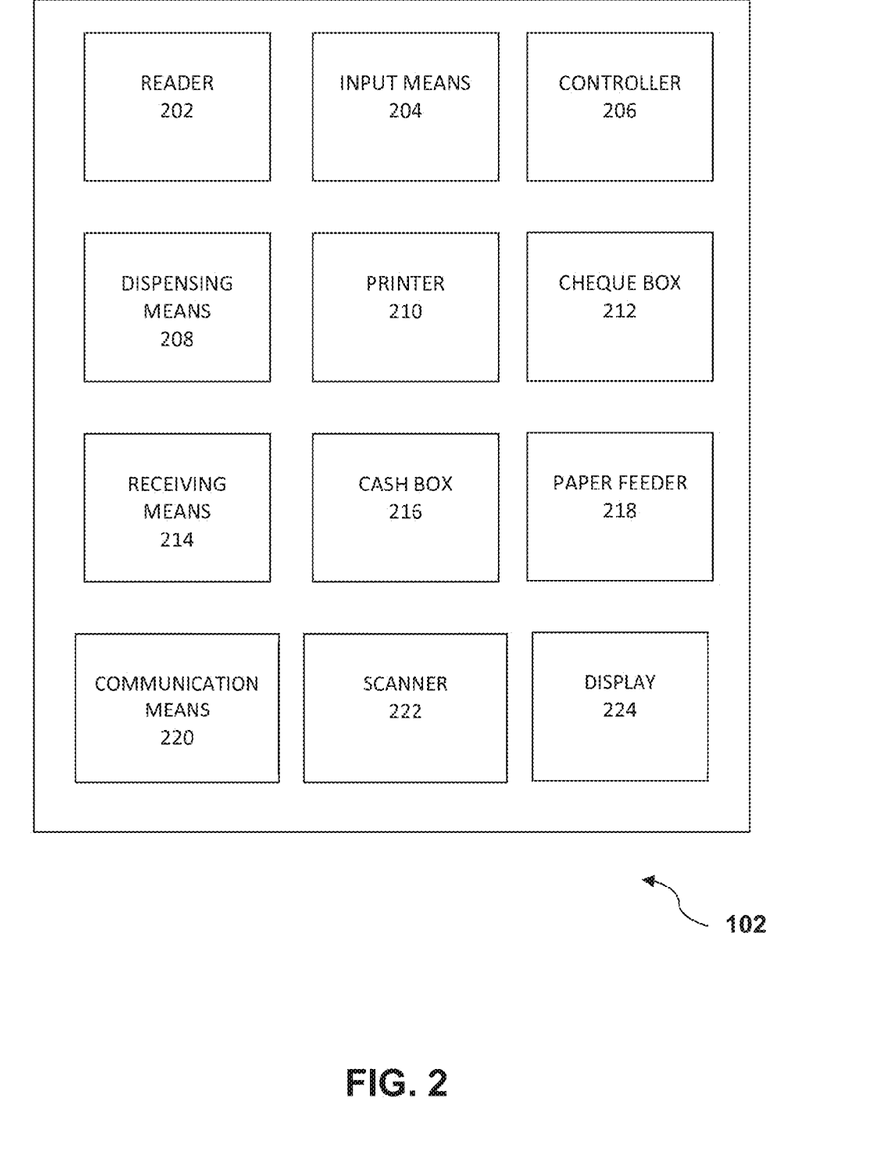
FIG. 2 illustrates an exploded view of the kiosk in accordance to the preferred embodiment herein.

FIG. 2 illustrates an exploded view of the kiosk 102 in accordance to the preferred embodiment herein. The kiosk 102 include a reader 202, an input means 204, a controller 206, a dispensing means 208, a printer 210, a cheque box 212, a receiving means 214, a cash box 216, a paper feeder 218, a communication means 220, a scanner 222 and a display 224. The reader 202 is used to read the coded information in the pre-processed receipt 108 to obtain the information related bank transaction. The cheque box 212 and cash box 216 used to store the cheque and the cash which is received from the user respectively. The receiving means 214 is configured to receive a currency and optically identifies the nature and denomination of the currency by the scanner 222. Currency can include any combination of cash, such as bills and coins, coupons, cheques, gift certificates, prepaid convenience cards any other negotiable instrument with a cash equivalent value able to secure a transaction. It is further contemplated that in addition to depositing currency, a user that does have a bank account or a credit card can similarly secure a payment transaction with a creditor with a debit or credit card. Once the currency is validated, it is verified with the information extracted by the reader 202 i.e. the amount of currency is verified with the transaction amount extracted from the coded information. Any deposit of the user into the transaction kiosk 102 in excess of the balance is immediately refunded through the receiving means 214. The paper feeder 218 includes a different paper rolls such as receipt paper roll and the demand draft paper roll and the feeder is configure to select and feed at least one paper roll based on the type of bank transaction. The communication means 220 is used to communicate the information from the kiosk 102 to the central bank server 106. The communication means 220 can be established by any wired/wireless communication technology.

In accordance to FIG. 1B, the first kiosk 102A is configured to include the input means 204, the controller 206, the dispensing means 208, the printer 210 and the display 224 alone to receive information and dispense the pre-processed receipt 108. The second kiosk 102B is configured to include the reader 202, the input means 204, the controller 206, the dispensing means 208, the printer 210, the cheque box 212, the receiving means 214, the cash box 216, the paper feeder 218, the communication means 220, the scanner 222 and the display 224.

Figure 3A:
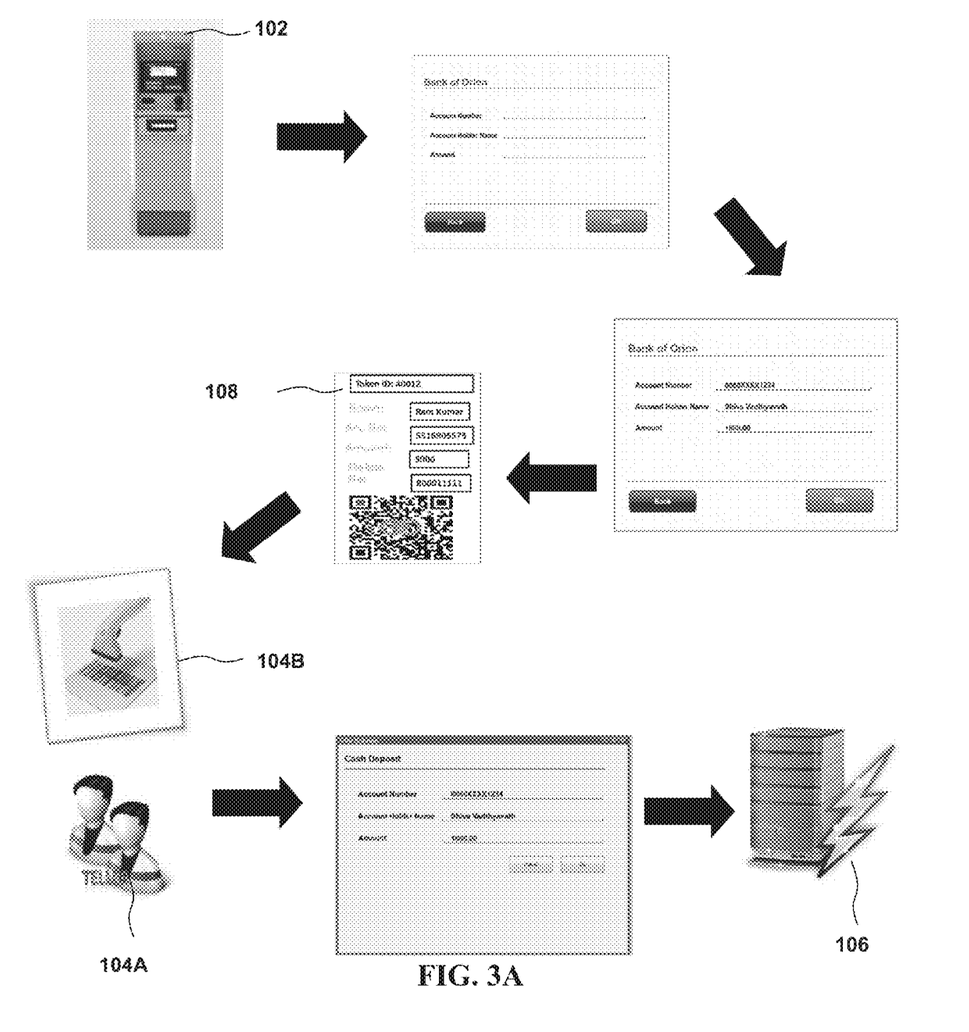
FIG. 3A illustrates a method for performing the bank transaction through the pre-processed receipt using the teller system as shown in FIG. 1 in accordance to one embodiment herein.
Figure 3B:
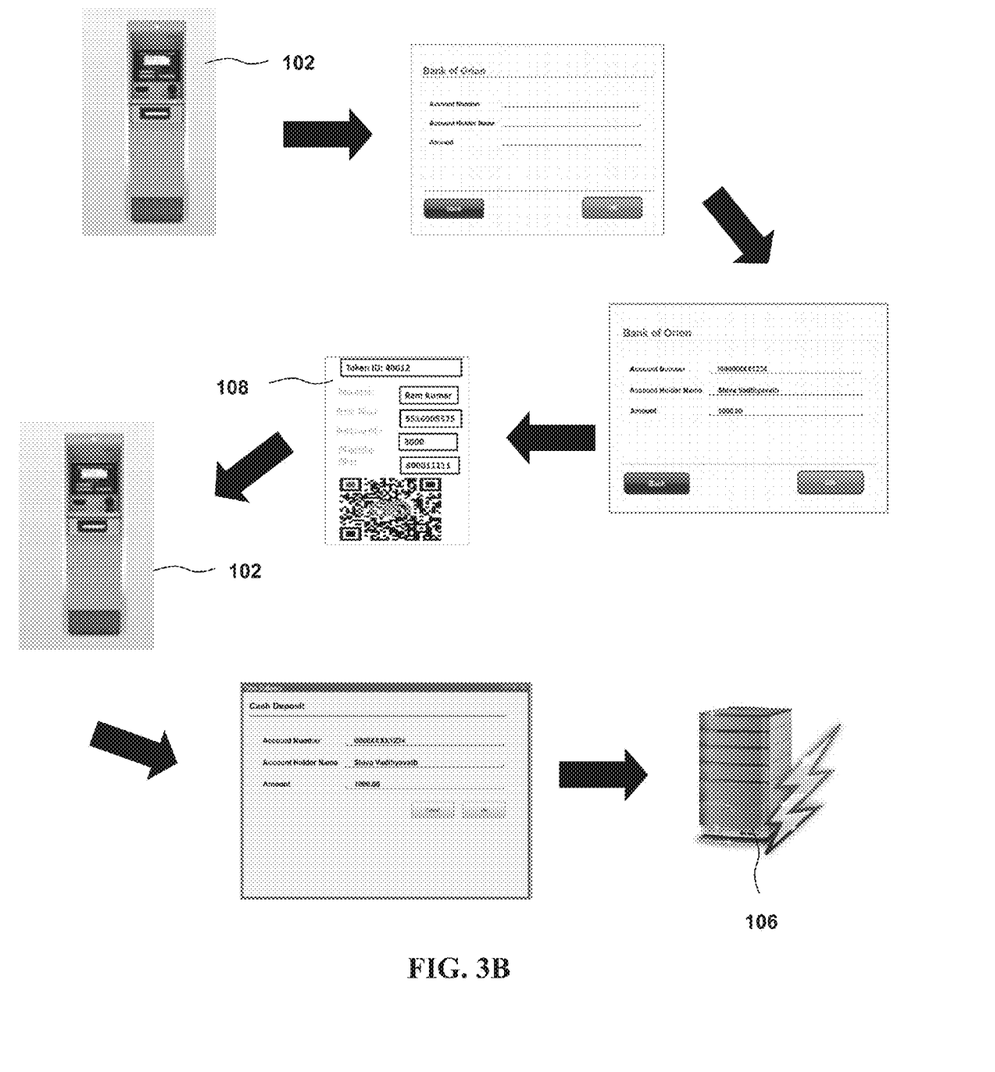
FIG. 3B illustrates a method for performing the bank transaction through the pre-processed receipt using the kiosk as shown in FIG. 1 in accordance to another embodiment herein.
Figure 3C:
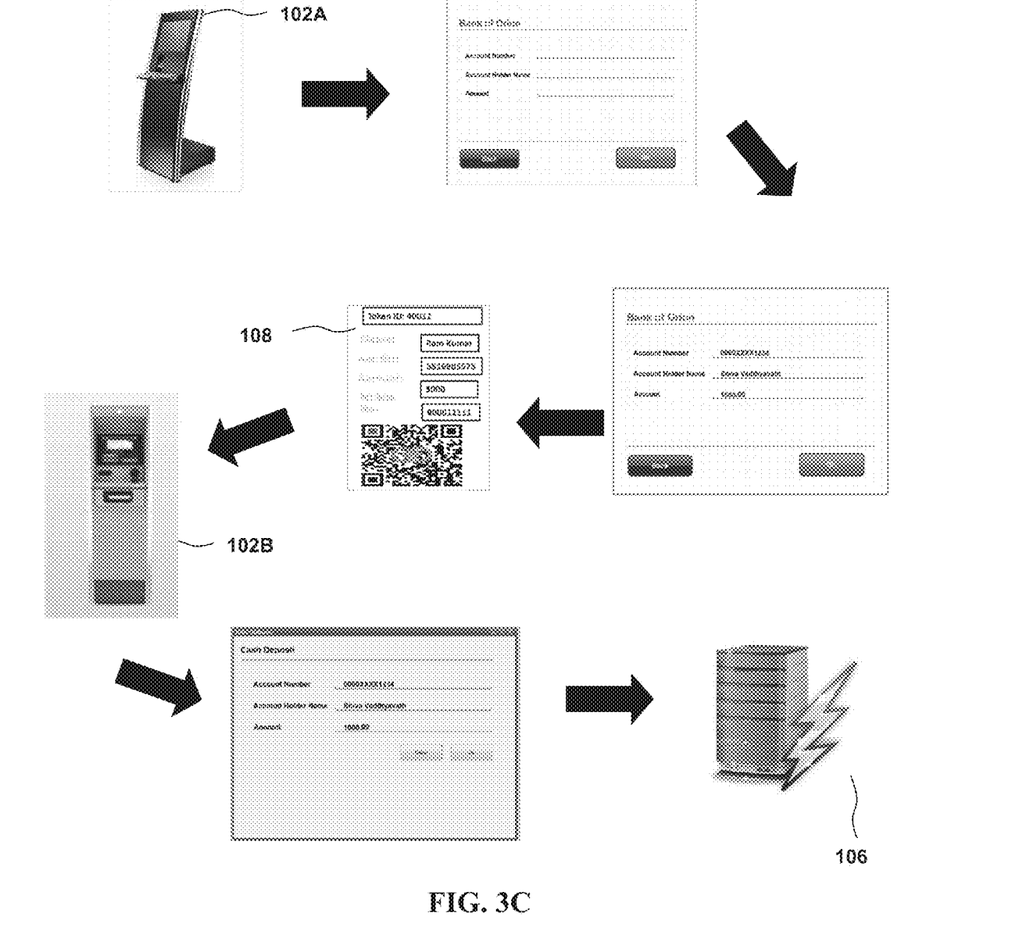
FIG. 3C illustrates a method for performing the bank transaction through the pre-processed receipt using the kiosk as shown in FIG. 1B in accordance to another embodiment herein.

FIG. 3A illustrates a method for performing the bank transaction through the pre-processed receipt 108 using the teller system 104 as shown in FIG. 1A and FIG. 1B in accordance to one embodiment herein. FIG. 3B illustrates a method for performing the bank transaction through the pre-processed receipt 108 using the kiosk 102 as shown in FIG. 1A in accordance to another embodiment herein. FIG. 3C illustrates a method for performing the bank transaction through the pre-processed receipt 108 using the second kiosk 102B as shown in FIG. 1B in accordance to another embodiment herein. As explained earlier, once the user obtains the pre-processed receipt 108 from the kiosk 102. The user has a freedom to use the pre-processed receipt 108 for performing the bank transaction using the teller system 104 as well as using the kiosk 102 again.

Figure 4:
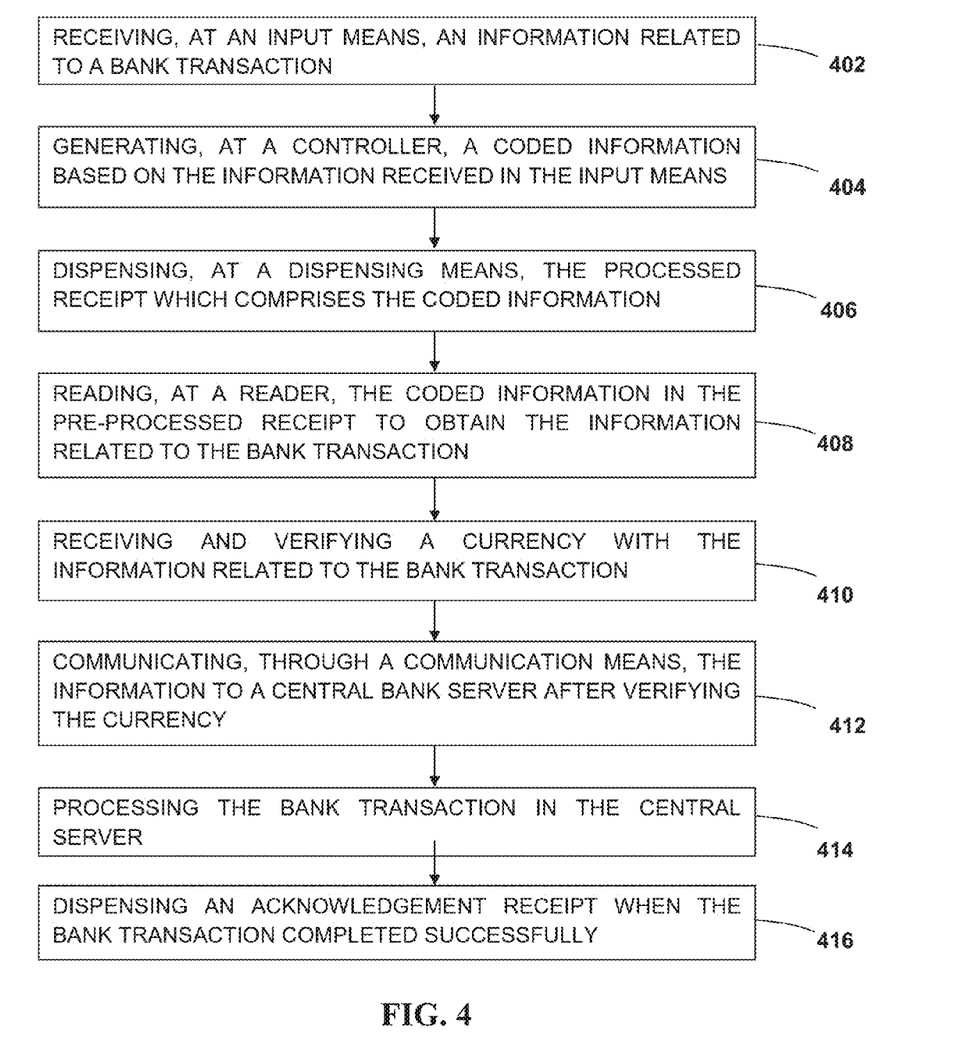
FIG. 4 is a flow diagram which illustrates a method for reducing the processing time for a bank transaction by using the system as shown in FIG. 1 in accordance to the preferred embodiment herein.

FIG. 4 is a flow diagram 400 which illustrates a method for reducing the processing time for a bank transaction by using the system 100 as shown in FIG. 1 in accordance to preferred embodiment herein. In step 402, the user approaches the kiosk 102 and inputs the information related to bank transaction which he/she would like to perform. In step 404, the controller 206 of the kiosk 102 receives the information and generates the coded information by embedding the information obtained from the user. In step 406, the kiosk 102 dispenses the pre-processed receipt 108 through the dispensing means 208 which includes the coded information. In step 408, the pre-processed receipt 108 is read by the reader 202 or 104A to extract the information related to the bank transaction. In step 410, the cash/cheque received from the user and the same is validated with the information obtained by the reader 202 or 104A. In step 412, the information is communicated to the central bank server 106 once the validation of cash/cheque is completed successfully. In step 414, the information is processed in the central bank server 106 and sends the notification to the kiosk 102 or the teller system 104 based on the information from where it is obtained. In step 416, the kiosk 102 dispenses the acknowledgement slip or the teller 104B provides the acknowledgement slip upon receiving the notification from the central bank server 106.

Figure 5:
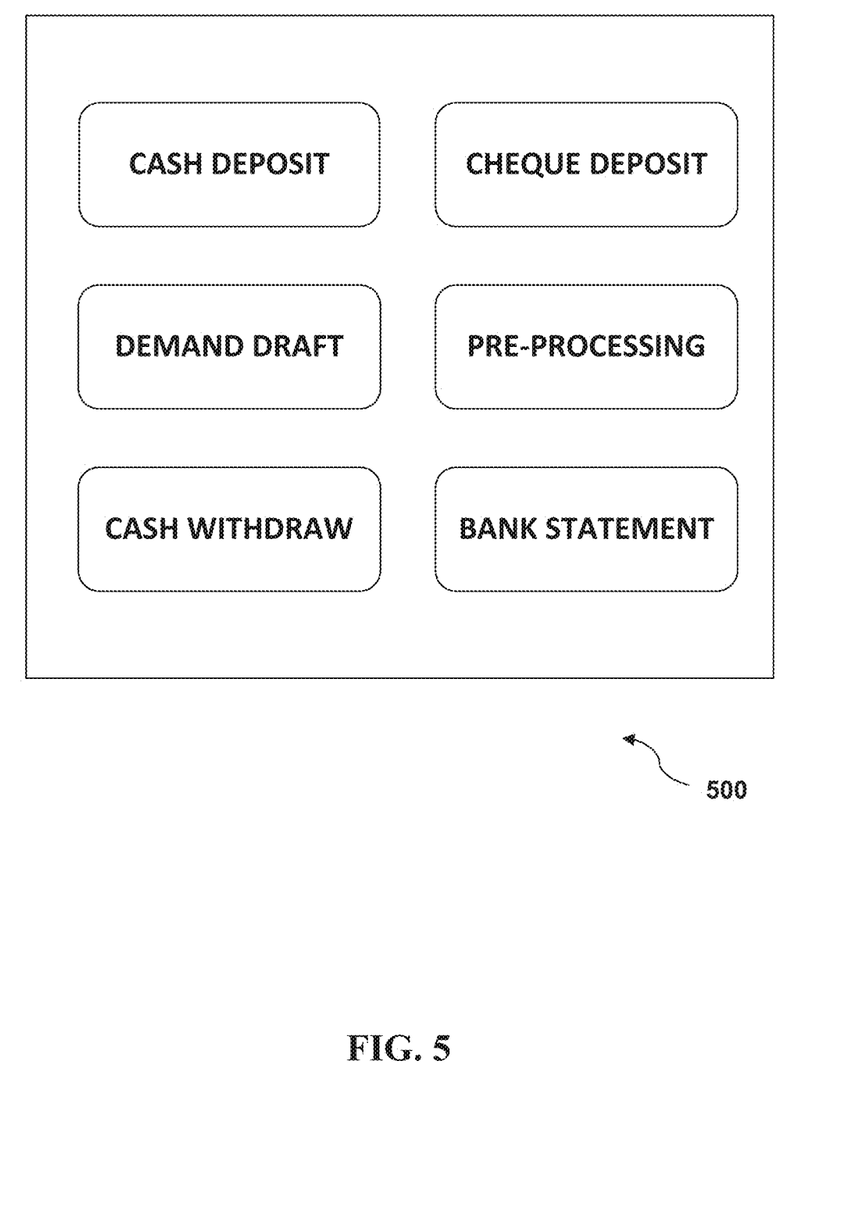
FIG. 5 illustrates a main menu screen which is displayed in the kiosk in accordance to the preferred embodiment herein.

FIG. 5 illustrates a main menu screen 500 which is displayed in the kiosk 102 in accordance to the preferred embodiment herein. The main menu screen includes the list of options but not limited to pre-processing, cash deposit, cheque deposit, cash withdraw, bank statement and Demand draft.

Figure 6:
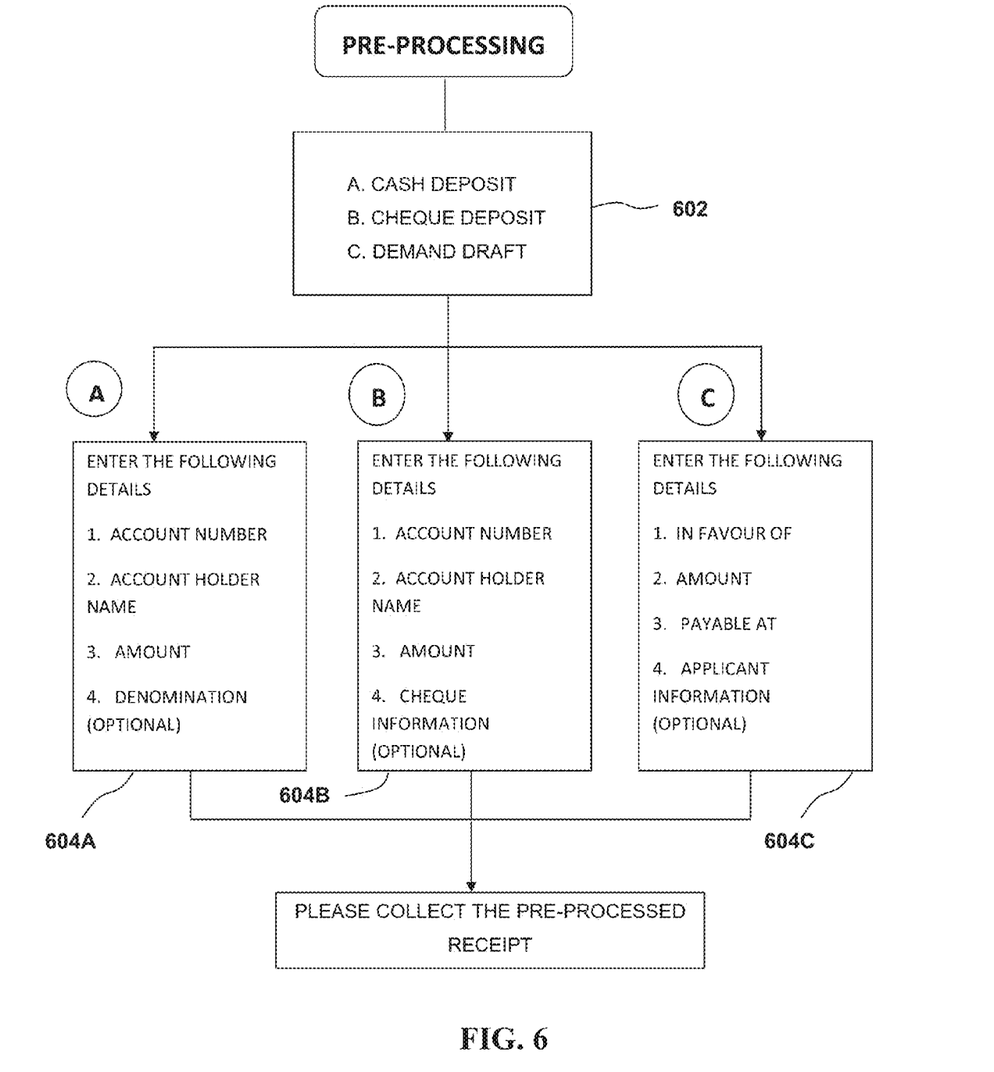
FIG. 6 illustrates a series of exemplary Graphical User Interface (GUI) messages displayed on the kiosk to the user when the user select the option pre-processing in the main menu screen as shown in FIG. 5 according to the preferred embodiment herein.

FIG. 6 illustrates a series of exemplary Graphical User Interface (GUI) messages displayed on the kiosk 102 to the user when the user select the option pre-processing in the main menu screen 500 as shown in FIG. 5 according to the preferred embodiment herein. The pre-processing option is used to generate the pre-processed receipt 108 for performing the bank transactions. Once the user selects pre-processing option in the main menu screen 500 the kiosk 102 displays the sub-menu screen 602 which includes sub-options with different types of bank transactions. The different types of bank transaction include but not limited to (a) cash deposit, (b) cheque deposit and (c) demand draft. The kiosk 102 will display the information entry screen 604A-C, when the user selects at least one of the sub-options. The information entry screen 604A-C is configured according to the sub-option selected. For example, the user selects sub-option cash deposit then the information entry page 604A includes only three fields such as an account number, an account name and an amount. If the user selects the demand draft sub-option, then the information entry page 604C includes three fields such as in favor of, an amount and a payable branch. The controller 206 of the kiosk 102 receives the information from the information entry page 604A-C and generates the coded information. The controller 206 also prints the coded information in the receipt and dispenses the pre-processed receipt 108 through dispensing means 208.

Figure 7:
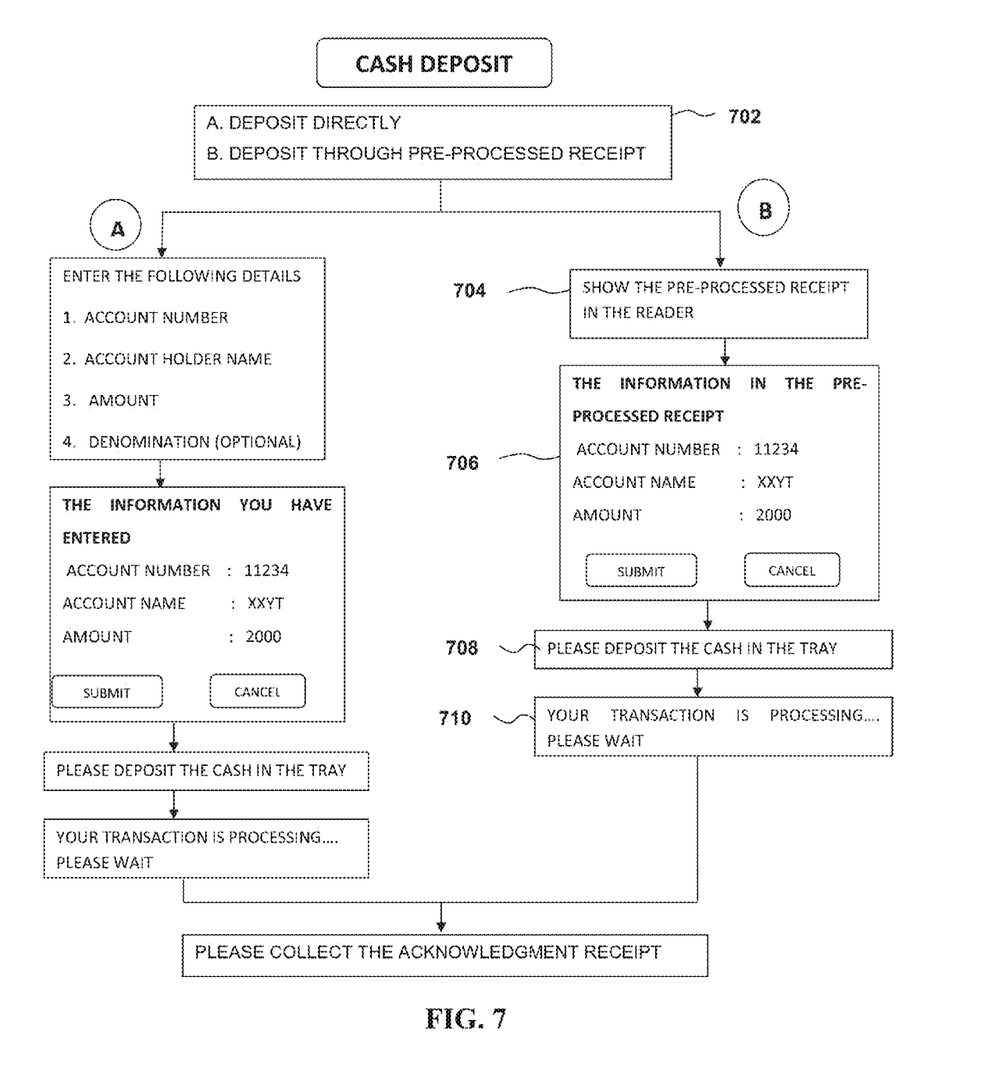
FIG. 7 illustrates a series of exemplary Graphical User Interface (GUI) messages displayed on the kiosk to the user when the user select the option cash deposit in the main menu screen as shown in FIG. 5 according to the preferred embodiment herein.

FIG. 7 illustrates a series of exemplary Graphical User Interface (GUI) messages displayed on the kiosk 102 to the user when the user select the option cash deposit in the main menu screen 500 as shown in FIG. 5 according to the preferred embodiment herein. The cash deposit option is used to deposit the cash to the account holder directly without approaching the teller system 104. The display 224 of the kiosk 102 displays the sub-menu 702 which includes sub-options such as (a) deposit directly and (b) deposit through pre-processed receipt 108. The first sub-option 'deposit directly' is operating like conventional kiosk which is used for depositing the cash directly to the account number by placing the cash in the cash tray (i.e. receiving means 214) after entering the account details. When the user selects the second sub-option (b) 'deposit through pre-processed receipt' 108, the kiosk 102 displays the message "Show the pre-processed receipt in the reader" 704. Once the user shows the pre-processed receipt 108 to the reader 202, the reader 202 reads the coded information and extracts the information. The extracted information is displayed in the kiosk 102 along with two options such as submit or cancel 706. The user can verifies the information and proceed the transaction by choosing submit and cancel the transaction by choosing cancel option. The kiosk 102 displays the message "Please deposit the cash in the tray" 708, when the user selects submit option. The tray (i.e.) receiving means 214 is configured to senses the cash and takes the cash inside the kiosk 102. The cash is validated inside the kiosk 102 and verified with the information extracted in the pre-processed receipt 108. The kiosk 102 displays the message "The transaction could not be completed . . . please check the cash you have deposited" when the cash deposited in the receiving means is not matching with the information extracted from the pre-processed receipt 108. Once, the validation and verification is completed successfully then the kiosk 102 sends the information to the central bank server 106 and completes the transaction. The kiosk 102 displays the message "Your transaction is processing . . . . Please wait" 710 while the kiosk 102 communicating the information to the central bank server 106. The dispensing means 208 dispenses the acknowledgement receipt upon receiving the notification from the central bank server 106.

Figure 8:
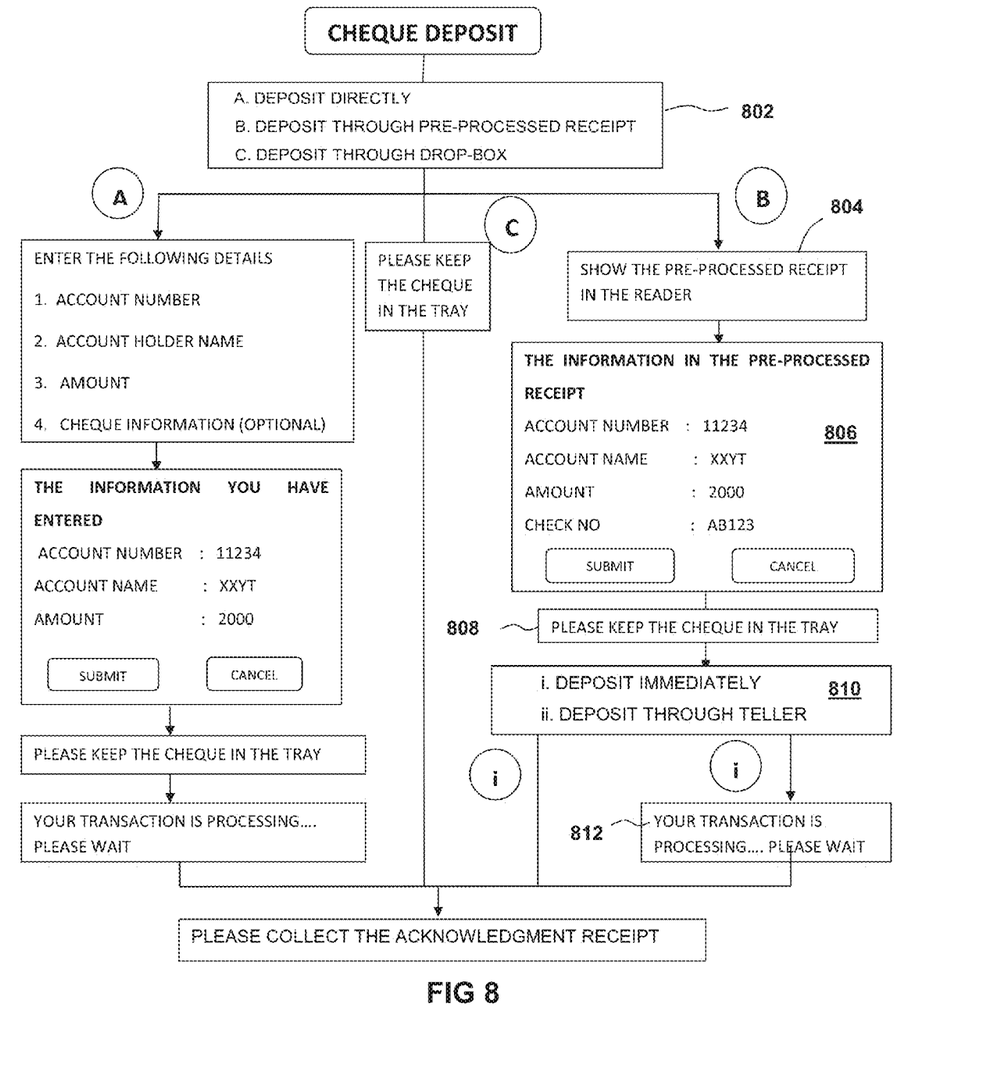
FIG. 8 illustrates a series of exemplary Graphical User Interface (GUI) messages displayed on the kiosk 102 to the user when the user select the option cheque deposit in the main menu screen as shown in FIG. 5 according to the preferred embodiment herein.

FIG. 8 illustrates a series of exemplary Graphical User Interface (GUI) messages displayed on the kiosk 102 to the user when the user select the option cheque deposit in the main menu screen 500 as shown in FIG. 5 according to the preferred embodiment herein. The cheque deposit option is used to deposit the cheque to the account holder directly without approaching the teller system 104. The display 224 of the kiosk 102 displays the sub-menu 802 which includes sub-options such as (a) deposit directly, (b) deposit through pre-processed receipt 108 and (c) deposit through drop-box. When the user selects the third sub-option (c) deposit through drop-box, the kiosk 102 displays the instruction "Please keep the cheque in the tray". The cheque has been taken inside the kiosk 102 when the tray senses the cheque and collected in different partition of the cheque box 212. The dispensing means 208 dispenses the acknowledgement slip by printing the copy of the cheque which is placed in the tray 214 along with the notification that the cheque has been received for further processing.

In one scenario the user selects the first sub-option (a) deposit directly from the sub-menu screen 802. The kiosk 102 displays information entry page for receiving the information related to the cheque deposit. The kiosk 102 displays the instruction "Please keep the cheque in the tray" after receiving the information through the information entry page. The cheque has been taken inside the kiosk 102 when the tray senses the cheque and read by the scanner (not shown in figure) positioned within the kiosk 102. The information provided in the cheque such as an account name, an account number and an amount is obtained by scanning the cheque using scanner. Further, the information received through the information entry page and the information obtained through the scanner is compared by the controller 206. If both information are same then the kiosk 102 sends the information to the central bank server 106 through the communication means 220 for completing bank transaction. Otherwise, the kiosk 102 displays the error message and dispenses the check through the dispensing means 208. The printer 210 of the kiosk 102 prints the acknowledgement slip along with the notification for cheque has been successfully deposited, when the notification is received from the central bank server 106.

In another scenario, the user selects the second sub-option (b) deposit through pre-processed receipt 108 from the sub-menu screen 802. The kiosk 102 displays the message "Show the pre-processed receipt in the reader" 804. Once the user shows the pre-processed receipt 108 to the reader 202, the reader 202 reads the coded information in the pre-processed receipt 108 and extracts the information. The extracted information is displayed in the kiosk 102 along with two options such as submit or cancel 806. The user can verifies the information and proceed the transaction by choosing submit option and cancel the transaction by choosing cancel option. The kiosk 102 displays the message "Please deposit the cheque in the tray" 808, when the user selects the submit option. The kiosk 102 would display the message "Your transaction is cancelled", when the user select the cancel option. The tray (i.e.) receiving means 214 is configured to senses the cheque and to transfer the cheque inside the kiosk 102. The cheque is scanned using scanner 222 placed inside the kiosk 102 to obtain the information from the cheque. The controller 206 validates the information obtained from the cheque and the information extracted in the pre-processed receipt 108. The kiosk 102 displays the message "The transaction could not be completed . . . please check the cheque you have deposited" when the information obtained from the cheque is does not matching with the information extracted from the pre-processed receipt 108. Once the validation completed successfully, the kiosk 102 displays the sub-options 810 such as (i) deposit automatically and (ii) deposit through teller 104. The kiosk 102 sends the information to the central bank server 106 and completes the transaction, when the user selects the first sub option i.e. (i) deposit automatically. The kiosk 102 displays the message "Your transaction is processing . . . . Please wait" 812 while the kiosk 102 communicating the central bank server 106. The kiosk 102 dispenses the acknowledgement receipt along with the indication that the transaction completed. The kiosk 102 dispenses the acknowledgment slip to the user along with the notification that the cheque has been received for further processing, when the user selects the second sub-option "(ii) deposit through teller" in the screen 810. In such case, the cheque is collected in the separate partition of the cheque box 212. The cheques which are completed transaction are collected in another partition of the cheque box 212.

Figure 9:
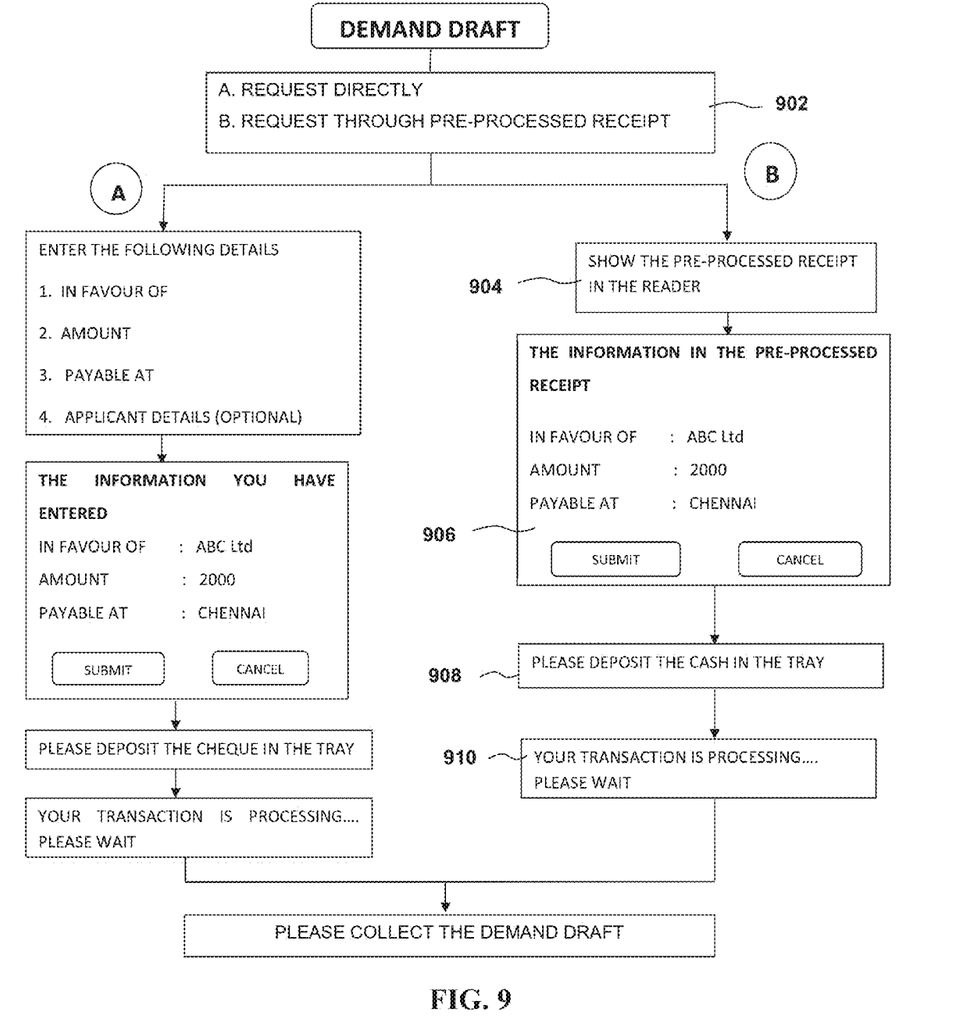
FIG. 9 illustrates a series of exemplary Graphical User Interface (GUI) messages displayed on the kiosk to the user when the user selects the option demand draft in the main menu screen as shown in FIG. 5 according to the preferred embodiment herein.

FIG. 9 illustrates a series of exemplary Graphical User Interface (GUI) messages displayed on the kiosk 102 to the user when the user selects the option demand draft in the main menu screen 500 as shown in FIG. 5 according to the preferred embodiment herein. The demand draft (DD) option is used to obtain the demand draft without approaching the teller system 104. The display 224 of the kiosk 102 displays the sub-menu 902 which includes sub-options such as (a) new demand draft request and (b) DD request through the pre-processed receipt 108. The first sub-option new demand draft request is operating like conventional kiosk 102 which is used for obtaining the DD with the specified information by placing the cash in the tray (i.e. receiving means). When the user selects the second sub-option (b) deposit through pre-processed receipt 108, the kiosk 102 displays the message "Show the pre-processed receipt in the reader" 904. Once the user shows the pre-processed receipt 108 to the reader 202, the reader 202 reads the coded information and extracts the information. The extracted information is displayed in the kiosk 102 along with two options such as submit or cancel 906. The user can verifies the information and proceed the transaction by choosing submit and cancel the transaction by choosing cancel option. The kiosk 102 displays the message "Please deposit the cash in the tray" 908, when the user selects submit option. The tray (i.e.) receiving means 214 configured to sense the cash and to transfer the cash inside the kiosk 102. The controller 206 validates the cash with the information which is extracted from the pre-processed receipt 108. Once, the validation is completed successfully, the kiosk 102 sends the information to the central bank server 106 and completes the transaction. The kiosk 102 displays the message "Your transaction is processing . . . . Please wait" 910 while the kiosk 102 communicating to the central bank server 106. The kiosk 102 prints the demand draft and dispenses the DD through the dispensing means 208. The kiosk 102 displays the message "The transaction could not be completed . . . please check the cash you have deposited" when the cash deposited in the tray 214 is does not matching with the information extracted from the pre-processed receipt 108.

When the user, selects the options cash withdraw or bank statement as shown in the menu 500 of FIG. 5 is operating similar to conventional Automatic Teller Machine (ATM). However, when the user uses the pre-processed receipt 108 for performing the above options. The kiosk 102 would request authentication key before dispensing the cash or before dispensing the bank statement.

The present embodiment facilitates to provide the system and method for performing various bank transactions with less processing time. The kiosk 102 allows the user to generate the pre-processed receipt 108 with the coded information. The coded information includes the necessary information related to the bank transaction which he/she would like to perform. The user has a freedom to use the pre-processed receipt 108 in the teller system 104 as well as the kiosk 102 for performing bank transaction with the minimum processing time. In one embodiment, the kiosk 102 allows the user to generate the pre-processed receipt 108 by embedding the expiry time and date of the pre-processed receipt 108 in the coded information. This will avoid the usage of the same pre-processed receipt 108 for multiple times as well as unauthorized use of the pre-processed receipt. In this scenario, the kiosk 102 would display the error message in the display 224 when the user uses the pre-proceed receipt 108 when the expiry time and date of the pre-processed receipt 108 is lapsed.

In another embodiment, the kiosk 102 allows the user to generate the pre-processed receipt 108 without embedding the expiry time and date of the pre-processed receipt in the coded information. This feature would be useful for the user who wants to perform the similar bank transaction for many times through the single pre-processed receipt 108.

The systems and methods disclosed herein may be embodied in various forms including, for example, a data processor, such as a computer. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The foregoing description is a specific embodiment of the present invention. It should be appreciated that this embodiment is described for purpose of illustration only. It is evident to those skilled in the art that although the invention herein is described in terms of specific embodiments thereof, there exist numerous alternatives, modifications and variations of the invention. It is intended that all such modifications and alterations be included insofar as they come within the spirit and scope of the invention as claimed or the equivalents thereof. Hence all variations, modifications and alternatives that fall within the scope of the appended claims come under the gamut of the invention.

What is claimed is:

1. A system for reducing a processing time for processing a bank transaction comprising:
a kiosk comprising:
an input for receiving information related to processing the bank transaction;
a display for displaying an interface in connection with the received input, wherein the interface presents three options for selection a cash deposit bank transaction, a check deposit bank transaction, and a demand draft bank transaction, and wherein the received input includes a selection for one of the three options:
a controller which is configured to receive said information and to generate coded information that includes the selection and the selection is one of the check deposit bank transaction and the demand draft bank transaction; and
a receipt dispenser which dispenses a pre-processed receipt that comprises said coded information and the pre-processed receipt for subsequently completing and processing the bank transaction, and wherein the receipt dispenser is configured to print deposit information received from a subsequently presented pre-processed receipt by printing a copy of a deposited check on a deposit receipt.

2. The system as claimed in claim 1, further comprising:
a reader for reading said pre-processed receipt and obtaining said information related to said bank transaction from said coded information; and
a controller for communicating said information to a central bank server and completing said bank transaction.

3. The system as claimed in claim 1, wherein said pre-processed receipt comprises an expiry time and expiry date and said pre-processed receipt comprises a token ID which is communicated to said central bank server along with said information related to said bank transaction.

4. The system as claimed in claim 1, wherein said coded information is in the form of at least one of a QR code and a one-dimensional barcode.

5. The system as claimed in claim 1, wherein said information comprises an account number, an account name and an amount corresponds to said bank transaction.

6. The system as claimed in claim 1, wherein said input comprises at least one of: a touch screen, a keyboard, and a card reader.

7. The system as claimed in claim 1, wherein said kiosk further comprises:
a reader for reading said pre-processed receipt and obtaining said information related to said bank transaction from said coded information; and
a communication device for communicating said information to a central bank server and completing said bank transaction.

8. The system as claimed in claim 7, wherein said kiosk further comprises a currency receiver which is configured to receive and validate a currency item for said bank transaction.

9. A method for processing a bank transaction comprising:
receiving from a user, at an input of a kiosk, input information related to processing the bank transaction, wherein the input information comprises an account number, an account name, and a transaction amount, and wherein the user selects a type of transaction for the bank transaction in response to an interface displayed on a display of the kiosk, the interface presenting banking transaction types available for selection as the type as: a cash deposit banking transaction, a check deposit banking transaction, and a demand draft banking transaction;
generating, at a controller of the kiosk, coded information based on said input information received at said input, wherein the coded information includes the selection for the type of transaction for the bank transaction, and wherein the selection is one of the check deposit banking transaction and the demand draft banking transaction; and
dispensing, at a receipt dispenser of the kiosk, a processed receipt which comprises said coded information for subsequently completing and processing the bank transaction, and dispensing, at the receipt dispenser of the kiosk, a copy of a deposited check associated with a subsequently presented pre-processed receipt at the kiosk.

10. The method as claimed in claim 9, further comprising:
reading, at a reader of a teller system, different from the kiosk, said coded information in said pre-processed receipt to obtain said information related to said bank transaction to complete the bank transaction.

11. The method as claimed in claim 9, further comprising:
reading, at a reader of said kiosk, said coded information in said pre-processed receipt to obtain said information related to said bank transaction,
receiving, at a currency receiver, a currency item;
verifying, at said controller, said currency item with said amount;
communicating said information to a central bank server after verifying said currency item;
processing, at said central bank server, said information and completing said bank transaction; and
dispensing, at said receipt dispenser, an acknowledgement slip when said bank transaction is completed successfully.

12. The method as claimed in claim 9, wherein coded information is in the form of at least one of a QR code and a one-dimensional barcode.

13. The method as claimed in claim 9, wherein said pre-processed receipt comprises an expiry time and expiry date and said pre-processed receipt comprises a token ID which is communicated to said central bank server along with said information related to said bank transaction.

14. The method as claimed in claim 13, further comprising:
inputting, using a controller, said token ID to said central bank server;
retrieving said information corresponding to said token ID from said central server;
verifying said information with a user; and
communicating said information to a central bank server for processing said bank transaction.

15. The method of claim 9, wherein the input information comprises an ID token, the method comprising:
communicating, from the kiosk, to a central bank server the input information;
communicating, from a teller system that is different from the kiosk, to the central bank server the ID token without communicating the account number, the account name, or the transaction amount, wherein the teller system does not have the account number, the account name, or the transaction amount; and
receiving, from the central back server, at the teller system, the account number, the account name, and the transaction amount.

* * * * *